United States Patent [19]

Liu

[11] Patent Number: 4,562,222

[45] Date of Patent: Dec. 31, 1985

[54] POLYCARBONATE RESIN MIXTURES

[75] Inventor: Ping Y. Liu, Naperville, Ill.

[73] Assignee: General Electric Company, Mt. Vernon, Ind.

[21] Appl. No.: 683,659

[22] Filed: Dec. 19, 1984

Related U.S. Application Data

[63] Continuation-in-part of Ser. No. 421,788, Sep. 23, 1982, abandoned.

[51] Int. Cl.$^4$ ................. C08L 53/02; C08L 69/00
[52] U.S. Cl. .................... 524/505; 524/537; 525/92; 525/93
[58] Field of Search ............. 525/92, 537, 148, 146, 525/93; 524/505

[56] References Cited

U.S. PATENT DOCUMENTS

| | | | |
|---|---|---|---|
| 2,999,835 | 9/1961 | Goldberg | 260/42 |
| 3,028,365 | 4/1962 | Schnell et al. | 260/47 |
| 3,334,154 | 8/1967 | Kim | 260/860 |
| 3,431,224 | 3/1969 | Goldblum | 260/13 |
| 3,639,517 | 2/1972 | Kitchen et al. | 260/879 |
| 3,813,358 | 5/1974 | O'Connell | 524/46 |
| 4,001,184 | 1/1977 | Scott | 260/47 X A |
| 4,076,698 | 2/1978 | Anderson et al. | 526/348.6 |
| 4,080,356 | 3/1978 | Gergen et al. | 260/40 TN |
| 4,081,424 | 3/1978 | Gergen et al. | 524/146 |
| 4,090,996 | 5/1978 | Gergen et al. | 260/40 R |
| 4,091,053 | 5/1978 | Kitchen | 260/880 B |
| 4,122,131 | 10/1978 | Bussink et al. | 260/873 |
| 4,131,575 | 12/1978 | Adelmann et al. | 260/17.4 |
| 4,145,373 | 3/1979 | Baron et al. | 260/873 |
| 4,218,545 | 8/1980 | Serini et al. | 525/92 |
| 4,245,058 | 1/1981 | Liu | 525/148 |
| 4,267,096 | 5/1981 | Bussink et al. | 260/40 |

FOREIGN PATENT DOCUMENTS

| | | |
|---|---|---|
| 4645 | 10/1979 | European Pat. Off. . |
| 0028753 | 5/1981 | European Pat. Off . |
| 0059375 | 9/1982 | European Pat. Off. . |
| 3300857 | 8/1983 | Fed. Rep. of Germany . |
| 2213959 | 8/1974 | France . |

OTHER PUBLICATIONS

Heinert, D. H, Polycarbonate Blends With Improved Critical Thickness, Research Disclosure No. 20810, Aug. 1981, Dow Chemical Co.

Primary Examiner—Allan M. Lieberman
Attorney, Agent, or Firm—Martin B. Barancik

[57] ABSTRACT

A resin mixture comprising:
  (a) an aromatic polycarbonate resin preferably having no more than about 20% of the structural units of the formula

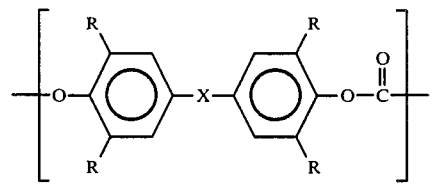

wherein R is the same or different and is alkyl of one to four carbon atoms, inclusive and X is $C_1$-$C_5$ alkylene or alkylidene, and
  (b) a modifier combination therefor comprising
    (i) a coupled resinous block copolymer having blocks comprising polymerized vinyl aromatic units connected to blocks comprising polymerized diene units; and
    (ii) a copolymer of an olefin and at least one of a $C_1$-$C_6$ alkyl acrylate, a $C_1$-$C_6$ alkyl methacrylate, acrylic acid, methacrylic acid, or a mixture of any of the foregoing, said modifier being present in said mixture in an amount of at least sufficient to impart to said mixture a resistance to environmental stress crazing and cracking greater than that possessed by said polycarbonate resin.

22 Claims, No Drawings

POLYCARBONATE RESIN MIXTURES

This application is a continuation-in-part application of copending Ser. No. 421,788, filed Sept. 23, 1982, now abandoned.

BACKGROUND OF THE INVENTION

This invention relates to thermoplastic resin compositions and more particularly is concerned with polycarbonate resin mixtures having improved impact strength, especially in thick sections, and extraordinary resistance to environmental stress crazing and cracking.

Aromatic carbonate polymers are well known, commercially available materials having a variety of applications in the plastics art. Such carbonate polymers may be prepared by reacting a dihydric phenol, such as 2,2-bis(4-hydroxyphenyl)-propane, with a carbonate precursor, such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength (except in thick molded sections), and a dimensional stability surpassing that of other thermoplastic materials. However, in certain applications, the use of aromatic polycarbonate resins is limited because they exhibit severe environmental stress crazing and cracking. "Environmental stress crazing and cracking" refers to the type of failure which is hastened by the presence of organic solvents such as, for example, gasoline, particularly high octane, no lead gasoline, acetone, heptane and carbon tetra-chloride when such solvents are in contact with stressed parts fabricated from aromatic polycarbonate resins. The most significant effect is a loss in vital impact strength and also an increase in brittle-type failure. Contact with such solvents may occur, for example, when parts are used under the hood of automobiles, or near the gasoline filler ports thereof, or when solvents are used to clean or degrease stressed parts made from polycarbonate resins.

At present, no entirely satisfactory means is available for reducing environmental stress crazing and cracking of polycarbonate resins, although a variety of methods have been proposed.

In Goldblum, U.S. Pat. No. 3,431,224, assigned to the same assignee as this application, for example, it is proposed to add modifiers to polycarbonate, in certain proportions, the modifiers comprising at least one member of the class consisting of polyethylene, polypropylene, polyisobutylene, a copolymer of ethylene and an ethyl acrylate, a copolymer of ethylene and propylene, a cellulose ester, a polyamide, a polyvinyl acetal, an alkyl cellulose ether, and a polyurethane elastomer. While the results with such modifiers are generally excellent, in thin sections, e.g., $\frac{1}{8}$ inch, it has been found, as will be shown later herein, that there is a tendency for failure to occur with these modifiers in thicker molded parts, e.g., of $\frac{1}{4}$ inch thickness, and such failure is of the undesirable brittle type, especially after exposure to high test gasoline. Another modifier proposed to be added to polycarbonate is reported in Research Disclosure No. 20810, Dow Chemical Company, August, 1981. Data are provided showing that polycarbonate modified with a linear low density polyolefin, namely, ethylene/octene-1 copolymer, provide good impact strength at increased part thickness. There is no suggestion therein that such a modifier will significantly enhance resistance to environmental stress crazing and cracking, and, as will be shown hereinafter, soaking a composition modified with a linear low density copolymer of ethylene and octene-1, even in thin sections, causes the impact strength to deteriorate substantially and results in brittle failure. Still other modifiers have been proposed for impact strength improvement, but none of them provides optimum environmental stress crazing and cracking resistance—applicant's earlier filed commonly assigned U.S. patent applications, Ser. No. 238,643, filed Feb. 26, 1981, now abandoned; Ser. No. 343,949, filed Feb. 29, 1982, now U.S. Pat. No. 4,430,476; and Ser. No. 352,382, filed Feb. 25, 1982, now U.S. Pat. No. 4,444,949, being expressly mentioned in this connection. Ser. Nos. 238,643 and 352,382 describe polycarbonates modified with a combination of a butadiene-styrene block copolymer of the coupled resinous type, an acrylate core-shell interpolymer and, optionally, an olefin/acrylate copolymer. Such compositions process well and are toughened, but there is no disclosure of significant solvent resistance and, as will be shown later herein, by themselves, the coupled resinous block copolymers do not provide significant resistance to environmental stress crazing and cracking, at relatively low and moderate blending levels, even in thin sections. Ser. No. 343,959, now abandoned, describes polycarbonate resins modified with a combination of the coupled resinous block copolymers and a linear low density polyolefin resin. There is no mention that such modifier combinations will provide enhanced resistance to environmental stress crazing and cracking.

SUMMARY OF THE INVENTION

Unexpectedly, in view of the foregoing, it has now been discovered that polycarbonate resins may be rendered more resistant to environmental stress crazing and cracking by incorporating therewith, in certain proportions, a modifier combination comprising a coupled resinous diene-vinyl aromatic block copolymer and an olefin polymer with an acrylate or methacrylate comonomer. In a preferred feature, the modifier combination will comprise the said coupled resinous block copolymer, the olefin copolymer with an acrylate or methacrylate comonomer and, in addition, a polyolefin, preferably a linear low density polyolefin.

It has now been found that when either of the above-mentioned modifier combinations is added to the polycarbonate resin, within a certain range, the resultant mixture possesses a resistance to environmental stress crazing and cracking greater than that possessed by the polycarbonate resin itself.

DESCRIPTION OF THE INVENTION

In accordance with the invention it has been found that the foregoing desirable properties are obtained with resin mixtures comprising
 (a) an aromatic polycarbonate resin; and
 (b) a modifier combination thereof comprising
  (i) a coupled resinous block copolymer having blocks comprising polymerized vinyl aromatic units connected to blocks comprising polymerized diene units, and
  (ii) a copolymer of an olefin and at least one of a $C_1$–$C_6$ alkyl acrylate, a $C_1$–$C_6$ alkyl alkyl methacrylate, acrylic acid methacrylic acid, or a mixture of any of the foregoing, said modifier being present in said mixture in an amount at least sufficient to impart to said mixture a resistance to environmental stress crazing and cracking greater than that possessed by said polycarbonate resin.

In accordance with another aspect of the invention there are provided resin admixtures comprising
 (a) an aromatic polycarbonate resin; and
 (b) a modifier combination thereof comprising
  (i) a coupled resinous block copolymer having blocks comprising vinyl aromatic units connected to blocks comprising polymerized diene units;
  (ii) a copolymer of an olefin and at least one of a $C_1$-$C_6$ alkyl acrylate, a $C_1$-$C_6$ alkyl methacrylate, acrylic acid or methacrylic acid; and
  (iii) a polyolefin resin, preferably a linear low density polyolefin resin,
said modifier being present in an amount sufficient to impart to said mixture a resistance to environmental stress crazing and cracking greater than that possessed by said polycarbonate resin.

The amounts of modifier combination to be employed vary broadly but, in general, best results will be obtained when the modifier is added to the polycarbonate resin in amounts ranging from about 4 parts to about 50 parts by weight per 100 parts by weight of the polycarbonate resin and the modifier. When less than about 4 parts are used, the improvement in the craze resistance of the polycarbonate is generally not readily detectable and, where the amount exceeds about 50 parts, the mixture begins to lose the beneficial properties of the polycarbonate. Preferably, the modifier is added in amounts ranging from about 10 to 30 parts per hundred of combined (a) and (b). Such addition may be accomplished in any manner so long as a thorough distribution of the modifier in the polycarbonate resin is obtained. For example, the mixing of materials may be accomplished by a variety of methods normally employed for incorporation of plasticizers or fillers into thermoplastic polymers including but not limited to mixing rolls, dough-mixers, Banbury mixers, extruders, and other mixing equipment. The resulting mixtures may be handled in any conventional manner employed for the fabrication or manipulation of thermoplastic resins. The materials may be formed or molded using compression, injection, calendering, extrusion and blow molding techniques, alone, or in any combination. Also, multiprocessing methods, such as extrusion-blow molding or coextrusion-co-injection, can be used, e.g., for multi-layer containers. It should be understood that the polycarbonate resin mixtures prepared in accordance with the invention may also contain, in addition to the above-mentioned polymers, other additives to lubricate, reinforce, prevent oxidation, or lend color to the material. Other additives such as mold release agents and stabilizers, are well known in the art, and may be incorporated without departing from the scope of the invention.

In addition to exhibiting an increased resistance to environmental stress crazing and cracking, the improved polycarbonate resin mixtures of the invention exhibit a relatively high impact strength without a substantial loss of tensile properties, and to a large extent retain the high softening temperatures of unmodified polycarbonate resin materials.

The fact that the addition of the combination of components specified above to a polycarbonate resin system provides a resinous mixture having an improved resistance to environmental stress crazing and cracking is totally unexpected and not fully understood.

The aromatic carbonate polymers (a) used to provide polycarbonate mixtures of the present invention may be prepared by reacting a dihydric phenol with a carbonate precursor, such as phosgene, a haloformate or a carbonate ester. Generally speaking, such carbonate polymers may be typified as possessing recurring structural units of the formula:

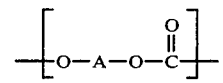

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl./g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether;
and the like.

A variety of additional dihydric phenols which may be employed to provide such carbonate polymers are disclosed in commonly assigned Goldberg, U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention. Branched polycarbonates are also useful. To avoid unnecessarily detailed description, the disclosures of U.S. Pat. Nos. 3,028,365; 3,334,154; 4,001,184; 4,131,575; are incorporated herein by reference. In any event, the preferred aromatic carbonate polymer is a homopolymer derived from 2,2-bis(4-hydroxyphenyl) propane (bisphenol A).

Generally speaking, the modifier combination components (b)(i), (b)(ii) and (b)(iii) which are admixed with polycarbonate resins to provide the resins mixtures of the invention are themselves well known commercially available thermoplastic resin materials.

The coupled block copolymer resin component (b)(i) will comprise block polymerized units of vinyl aromatic compounds, e.g., styrene, alpha-methylstyrene, vinyl toluene, para-methylstyrene and the like connected to blocks of polymerized diene units, e.g., units of butadiene, isoprene, 1,3-pentadiene, and the like. The preferred block copolymers will comprise units of polymerized styrene and polymerized butadiene. The butadiene portion, based on the total weight of the copolymer, can range from about 15 to about 40 weight percent. The styrene portion can range from about 60 to about 85 weight percent. In especially preferred butadiene styrene copolymers, the weight ratio of the styrene fraction to the butadiene fraction ranges from about 2 to 1 to about 3 to 1. The residual dienic unsaturation can be removed by selective hydrogenation, but is not preferred. The block copolymers may be made by any of several procedures well known to those skilled in the art. A suitable commercial material is Phillips Petroleum K-Resin KRO3 BDS polymer. This has a styrene-butadiene weight ratio of about 3:1 and a density of the order of about 1.01 g./$cm^3$. See U.S. Pat. Nos. 3,639,517 and 4,091,053, incorporated herein by reference.

Copolymer component (b)(ii) is made from an olefin, e.g., ethylene, propylene, or the like, copolymerized with one or more of a comonomer comprising a $C_1$-$C_6$ alkyl acrylate, e.g., methyl acrylate, ethyl acrylate, hexyl acrylate and the like; a $C_1$-$C_6$ alkyl methacrylate, e.g., methyl methacrylate, ethyl methacrylate, hexyl methacylate, and the like; acrylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The preferred copolymer for use as component (b)(ii) is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's Bakelite ®DPD-6169 ethylene-ethyl acrylate copolymer is suitable for use in the present invention.

Component (b)(iii), which may be an olefin homopolymer or copolymer, is selected from among the materials well known in the art as comprising this class. Preferred for use in this invention are polymers which have been derived from olefins containing from 2 to 10 carbon atoms. Special mention is made of polyethylene, polypropylene, polyisobutylene and ethylene-propylene copolymers and EPDM copolymers in their various forms, since these are the most readily available commercially.

Methods for the preparation of these polymers, both commerical and non-commercial, are abundantly described in the literature and known to those skilled in the art. The polyethylenes can be prepared by various procedures, using anionic, cationic or free-radical initiating catalysts, with conditions varied to produce a range of molecular weights and densities and different degrees of branching or non-branching for the polymer. In one procedure, which involves free radical initiation, ethylene gas is polymerized in the presence of a peroxide initiating catalyst at a pressure between 15,000 and 40,000 psi and a temperature between 100° and 200° C., to produce a relatively low density polymer, 0.90 to 0.94 g/$cm^3$.

The polyethylene can also be prepared by low pressure processes effective to attain a polymer of higher molecular weight and a higher density. In one such procedure, known as the Phillips process, ethylene is contacted in an insert solvent with a slurry of a catalyst, such as chromium oxide supported on silica-alumina, at pressures of 400 to 500 psig and temperatures of 130° to 170° C., followed by extraction of the polymer with hot solvent and purification, to produce a polyethylene product having a density between 0.96 to 0.97 g/$cm^3$.

Still other procedures are possible, such as emulsion polymerization in aqueous media in the presence of a peroxy compound, as well as suspension polymerization at low temperatures using a silver salt-peroxide redox system.

Any of the foregoing processes are utilizable to obtain polymers of ethylene suitable for use in the present compositions.

Also employable as component (b)(iii) is polypropylene, a common commercial form of which is crystalline isotactic polypropylene. Such polymers can be prepared anionically initiated reactions using Ziegler type catalysts, e.g., titanium halide such as $TiCl_3$ in combination with an organometallic co-catalyst such as trialkyl aluminum halide. Polymerization generally proceeds rapidly at temperatures between 25° and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst (e.g., transition metal compound and organometallic compound), or by free radical initiation under high pressures.

Polymers based on still higher olefins are not as readily available and, therefore, not as preferred. Examples of such higher polyolefins are polymers based on 3-methyl-1-butene ($H_2C$=$CHCH(CH_3)_2$); 1-pentene($H_2C$=$CHCH_2CH_3$); 4-methyl-1-pentene ($H_2C$=$CHCH_2CH_2$—$(CH_3)_2$) and isobutylene. They can be prepared by known procedures including those described in The Encylopedia of Polymer Science and Technology, John Wiley & Sons, Inc., Volume 9, pages 440–460 (1965).

The preferred linear low density polyolefin component (b)(iii) may be prepared by state-of-the-art polymerization processes such as those described in U.S. Pat. No. 4,076,698 and Eur. Pat. Appl. 4,645, both of which are incorporated by reference. The polymer may have a density between 0.89 and 0.96 g./cc. and a controlled concentration of simple side chain branching as opposed to random branching which distinguishes it from polymers such as high pressure low density polyethylene and high density polyethylene. The preferred range of density is 0.915 to 0.945 g./cc. The linear low density polymers preferably are made from ethylene and an alpha olefin of $C_3$ to $C_8$ carbon content, e.g., butene-1 and octene-1, or mixtures of such alpha-olefins. The comonomer is used in a minor amount, e.g., 10 mol % or less of the total amount of monomers. A preferred range is about 1–3 mol %. The preferred copolymer is a copolymer made from ethylene and butene-1 such as Escorene ®LPX-15 of Exxon, Houston, Tex.

Within the broad composition ranges specified above, the following have been found to provide desirable properties for the ternary mixtures: polycarbonate component (a) comprises from about 50 to about 96 parts by weight; A-B diblock copolymer component (b)(i) comprises from about 2 to about 25 parts by weight; and olefin-acrylate or methacrylate component (b)(ii) comprises from about 2 to about 25 parts by weight, per 100 parts by weight of components (a), (b)(i) and (b)(ii) combined. Desirable ranges for the quaternary mixtures are as follows: polycarbonate component (a) comprises from about 60 to about 89 parts by weight; component (b)(i) comprises from about 5 to about 20 parts by weight; olefin-acrylate or methacrylate component (b)(ii) comprises from about 5 to about 20 parts by weight; and polyolefin component (b)(iii) comprises from about 1 to about 10 parts by weight, per 100 parts by weight of components (a), (b)(i), (b)(ii) and (b)(iii) combined.

The resistance to environmental stress crazing and cracking of the polycarbonate resin mixtures prepared in accordance with the invention was determined by subjecting stressed specimens to gasoline soaking and then measuring their impact strength with special attention to the mode of failure, ductile failure being preferable. The specimens are ASTM D-256 impact test bars of two sizes: $2\frac{1}{2} \times \frac{1}{2}'' \times \frac{1}{8}''$ and $2\frac{1}{2}'' \times \frac{1}{2}'' \times \frac{1}{4}''$. Values of the desired stress were applied to each test bar by mounting on an ASTM stress jig (1 percent strain). The mounted bars were soaked 24 hours at room temperature in AMOCO ® unleaded premium grade gasoline. They were then removed from the jig, evaporated and dried for 24 hours. Izod impact strengths were then determined according to ASTM D 256 procedures on notched specimens. In all cases, the properties are compared with those of identical unsoaked, molded mixtures. Those which retain a substantial amount of impact resistance after soaking obviously are the best at resisting environmental stress cracking.

bonate resin mixtures were molded into the test specimens in a 3 oz. Van Dorn injection molding machine. The temperatures used were 270° C. on the cylinder and nozzle with a range of 265° C. to 285° C.

EXAMPLES 1 and 2

An aromatic polycarbonate derived from 2,2-bis(4-hydroxyphenyl)propane and having an intrinsic viscosity (i.v.) in the range of from about 0.46 to about 0.49 dl/g as determined in methylene chloride solution at 25° C. was mixed with a butadiene-styrene coupled resinous block copolymer (Phillips Petroleum KR03, hereinafter referred to as BDS), said copolymer having a weight ratio of styrene to butadiene of about 3:1; and an olefin acrylate copolymer having a weight ratio of ethylene:ethyl acrylate of about 4.5:1 (Union Carbide DPD 6169). The ingredients were then blended together by mechanically mixing them in a laboratory tumbler and the resulting mixture was fed to an extruder which was operated at about 255° C. The resulting extrudates were comminuted into pellets. The pellets were injection molded at about 265° C. to about 285° C. into test specimens of about $2\frac{1}{2}''$ by $\frac{1}{2}''$ by $\frac{1}{8}''$ and $2\frac{1}{2}''$ by $\frac{1}{2}''$ by $\frac{1}{4}''$, the latter dimension being specimen thickness. Some of the specimens were mounted on an ASTM stress jig (1% strain) and soacked in Amoco ® premium unleaded gasoline for 24 hours. They were removed from the jig, the gasoline allowed to evaporate at room temperature for 24 hours, and then they were tested. Where indicated, Izod impact strengths of these specimens were measured according to the notched Izod test, ASTM D 256, and are set forth in Table I. The weld line strength of the samples was measured with the specimens prepared in a double gate mold in the same way as the notched Izod samples. When polymer melt was injected through the gates, a weld line was then formed in the center of the sample. Measurements were made according to ASTM D 256. The superscript refers to the percent ductility of the foot lb. value. The samples labeled control was the bisphenol A polycarbonate, unmodified, or modified as indicated. The formulations used, and the results obtained are set forth in Table I:

TABLE 1

| POLYCARBONATE MODIFIED WITH COUPLED RESINOUS COPOLYMER AND OLEFIN-ACRYLATE COPOLYMER | | | | | | | |
|---|---|---|---|---|---|---|---|
| EXAMPLE | A* | B* | C* | D* | E* | 1 | 2 |
| Composition (pbw) | | | | | | | |
| polycarbonate | 100 | 96 | 94 | 95.7 | 94.3 | 80 | 85 |
| BD-S Block Copolymer | — | — | — | 4.3 | 5.7 | 15 | 10 |
| Ethylene-Ethyl Acrylate Copolymer | — | 4 | 6 | — | — | 5 | 5 |
| PROPERTIES: | | | | | | | |
| Notched Impact Strength | | | | | | | |
| $\frac{1}{8}''$ ft. lbs.-in. | 14.8** | 15.9 | 14.8 | 15.2 | 14.3 | 12.8 | 13.5 |
| $\frac{1}{4}''$ ft. lbs.-in. | 1.6° | 11.9 | 11.6 | 8.9$^{60}$ | 11.2 | 11.0 | 10.8 |
| Weld line strength, ft-lb | >40 | 3.8$^{40}$ | 3.8° | 8.8$^{60}$ | 8.9$^{80}$ | 5.5$^H$ | 9.3$^H$ |
| SOAKED IN GASOLINE | | | | | | | |
| Notched Impact Strength | | | | | | | |
| $\frac{1}{8}''$ ft. lbs.-in. | broke | 0.9° | 1.3° | 0.5° | 1.0° | 12.8 | 5.8 |
| $\frac{1}{4}''$ ft. lbs.-in. | — | 0.6° | 1.0° | — | — | 10.8 | 1.4° |

*Control
**Unless otherwise specified, all were ductile at failure.

DESCRIPTION OF THE PREFERRED EMBODIMENTS

In order that those skilled in the art may better understand how the present invention may be practiced, the following examples are given by way of illustration and not by way of limitation. All parts and percentages are by weight unless otherwise noted. The various polycar- The results demonstrate that the impact strengths of the new compositions of Examples 1 and 2 were substantially retained or better than polycarbonate alone in both regular and gasoline soaked testing. In comparison with controls showing polycarbonate plus (b)(i) or (b)(ii), the impact resistance after normal testing procedures is generally retained. However, after soaking in gasoline, the controls with (b)(i) or (b)(ii) experienced severe loss of impact resistance and a change to a brittle failure mode. The examples of the invention substantially retain their impact resistance at the 1/8" thickness. Some loss is observed for 1/4" thickness in Example 2 but it is still somewhat better than the controls. Weld line strength remains relatively high in the invention examples whereas gasoline resistance is substantially lowered in the controls. Example 1 is clearly preferred over Example 2.

EXAMPLES 3-6

The general procedures of Examples 1 and 2 are repeated, also including in the mixture a linear low density polyolefin which is a copolymer of ethylene and butene-1 (Escorene LPX-15). The formulations used and the results obtained are set forth in Table 2:

inch samples and that the impact strengths in the 1/4 inch samples were substantially retained or better than the controls. Furthermore, even after soaking in gasoline, the samples of the invention show retention of strength and desirable ductile mode failure in the 1/8" thickness. Two of the four controls showed significant decreases. In the 1/4" thickness test samples, the controls that maintained impact strength in the 1/8" test thickness test system lost their impact resistance and the failure mode changed from ductile to brittle. The invention samples generally retained their ductility upon break and in one case, Example 3, retained virtually all of its impact resistance. The weld line strength remains relatively high in the invention examples.

EXAMPLES 7-14

The general procedures of Examples 1 and 2 are repeated, also including polyolefin resins of various

TABLE 2

POLYCARBONATE MODIFIED WITH COUPLED RESINOUS
BLOCK COPOLYMER, OLEFIN-ACRYLATE COPOLYMER AND
LINEAR LOW DENSITY POLYOLEFIN

| EXAMPLE | A* | F* | G* | H* | 3 | 4 | 5 | 6 |
|---|---|---|---|---|---|---|---|---|
| Composition (pbw) | | | | | | | | |
| polycarbonate | 100 | 90 | 82 | 96 | 82 | 82 | 82 | 82 |
| BD-S Block Copolymer | — | — | 10 | — | 10 | 10 | 6 | 10 |
| Ethylene-Ethyl Acrylate Copolymer | — | 7 | — | — | 6 | 4 | 6 | 2 |
| Linear low density polyethylene | — | 3 | 8 | 4 | 2 | 4 | 6 | |
| PROPERTIES | | | | | | | | |
| Notched Impact Strength | | | | | | | | |
| 1/8" ft. lbs.-in. | 14.8** | 15.3 | 13.2 | 13.6 | 14.0 | 14.1 | 13.6 | 12.9 |
| 1/4" ft. lbs.-in. | 1.6° | 1.10 | 8.1 | 11.4 | 9.1 | 8.8 | 9.1 | 9.7 |
| weld line strength, ft-lb. | >40 | $8.9^{80}$ | 4.9° | 10.9 | 5.8 | $4.9^{20}$ | $6.3^H$ | $4.4^H$ |
| SOAKED IN GASOLINE | | | | | | | | |
| Notched Impact Strength | | | | | | | | |
| 1/8" ft. lbs.-in. | broke | 10.6 | 12.6 | 1.0° | 14.0 | 14.1 | 12.1 | 12.9 |
| 1/4" ft. lbs.-in. | — | 1.1° | 0.9° | — | 7.8 | $1.3^{50}$ | $1.8^{50}$ | 2.8 |

*Control
**Unless otherwise specified, all were ductile at failure

The results demonstrate that the impact strengths of the new compositions of Examples 3-6 were substantially retained in comparison with the controls in the 1/8 types. The formulations used and the results obtained are set forth in Table 3:

TABLE 3

POLYCARBONATE MODIFIED WITH COUPLED RESINOUS BLOCK
COPOLYMER, OLEFIN-ACRYLATE COPOLYMER, AND POLYOLEFIN

| | EXAMPLE | | | | | | | |
|---|---|---|---|---|---|---|---|---|
| | 7 | 8 | 9 | 10 | 11 | 12 | 13 | 14 |
| Composition (pbw) | | | | | | | | |
| Polycarbonate | 82 | 80 | 80 | 80 | 76 | 76 | 76 | 76 |
| BD-S Block Copolymer | 10 | 10 | 10 | 10 | 10 | 10 | 10 | 10 |
| Ethylene-Ethyl Acrylate Copolymer | 6 | 4 | 4 | 4 | 8 | 8 | 8 | 8 |
| Ethylene-propylene Copolymer[a] | 2 | — | — | — | — | — | — | — |
| Polypropylene[b] | — | — | 6 | — | — | — | — | 6 |
| High Density Polyethylene[c] | — | — | — | — | — | — | 6 | — |
| Linear Low Density Polyethylene[d] | — | 6 | — | — | 6 | — | — | — |
| Ethylene-propylene Copolymer[e] | — | — | — | 6 | — | 6 | — | — |
| PROPERTIES | | | | | | | | |
| Notched Impact Strength | | | | | | | | |
| 1/8" ft.-lbs.-in. | 12.9 | 14.2 | 12.9 | 11.5 | 6.8 | 5.7 | 6.0 | 11.9 |
| 1/4" ft.-lbs.-in. | 9.8 | 9.5 | 9.7 | 9.8 | 7.2 | 6.4 | 7.7 | 9.5 |
| Weld line strength, ft.-lb. | $4.9^H$ | $5.9^H$ | 2.7° | 4.3° | 1.7° | 1.8° | 1.0° | 2.7 |
| SOAKED IN GASOLINE | | | | | | | | |
| Notched Impact Strength | | | | | | | | |
| 1/8" ft.-lbs.-in. | 12.7 | 14.0 | 12.9 | 11.5 | 6.5 | 5.7 | 6.0 | 11.9 |

TABLE 3-continued
POLYCARBONATE MODIFIED WITH COUPLED RESINOUS BLOCK COPOLYMER, OLEFIN-ACRYLATE COPOLYMER, AND POLYOLEFIN

| | EXAMPLE | | | | | | | |
|---|---|---|---|---|---|---|---|---|
| | 7 | 8 | 9 | 10 | 11 | 12 | 13 | 14 |
| $\frac{1}{4}''$ ft.-lbs.-in. | 2.8 | 5.7 | 4.6 | 4.3 | 1.3° | 1.4[50] | 2.3° | 8.9 |

[a]Shell Chemical Co., 7522;
[b]Exxon Co., PP2032;
[c]USI Chemicals, LB742;
[d]Exxon Co., LPX-15;
[e]Hercules Co., SB8623

The results demonstrate that, even after soaking in gasoline, the Examples show a retention of strength and desirable ductile mode failure of all of the $\frac{1}{8}''$ samples and most of the $\frac{1}{4}''$ samples. The weld line strength data is consistent with the use of polyolefins in the compositions.

The compositions of this invention also maintain their beneficial properties, to a remarkable extent after re-extrusion, showing high resistance to shearing at elevated temperatures. The mixture of Example 3, polycarbonate, 82 parts; BD-S coupled resinous block copolymer, 10 parts; ethylene-ethyl acrylate copolymer, 6 parts; and ethylene-butene-1 LLDPE, 2 parts, was extruded and re-extruded 3, 6 and 9 times, and the extrudates were molded, aged in gasoline, and impact-tested by the foregoing procedures with the results set forth in Table 4:

TABLE 4
RECYCLABILITY OF POLYCARBONATE COMPOSITION OF EXAMPLE 3

| | | Re-extruded | | |
|---|---|---|---|---|
| Unnotched Izod Impact Strength | Virgin | 3× | 6× | 9× |
| $\frac{1}{8}''$, ft. lbs.-in, unaged | 14.1 | 15.3 | 14.7 | 14.8 |
| $\frac{1}{8}''$, ft. lbs.-in., aged in gasoline | 14.1 | 15.3 | 14.7 | 14.8 |
| $\frac{1}{4}''$, ft. lbs-in., unaged | 8.8 | 9.2 | 9.2 | 9.2 |

All parts failed in the desirable ductile mode.

EXAMPLES 15–16

Glass filled compositions are prepared, molded and tested according to the general procedure of Example 1. The formulations used and the results obtained are set forth in Table 5:

TABLE 5
GLASS FILLED COMPOSITIONS COMPRISING POLYCARBONATE, COUPLED RESINOUS BLOCK COPOLYMER, ETHYLENE-ETHYL-ACRYLATE COPOLYMER AND POLYOLEFIN

| EXAMPLE | 15 | 16 |
|---|---|---|
| Composition (pbw) | | |
| Aromatic polycarbonate[a] | 77.9 | 73.8 |
| BD-S Block Copolymer[b] | 9.5 | 9.0 |
| Ethylene-ethylacrylate copolymer[c] | 5.7 | 5.4 |
| Linear low density polyethylene[d] | 1.9 | 1.8 |
| Glass fibers, $\frac{1}{8}''$ chopped[e] | 5.0 | 10.0 |
| PROPERTIES | | |
| Notched Izod impact strength | | |
| Unaged, $\frac{1}{8}''$, ft. lbs./in. | 7.2 | 4.7 |
| Unaged, $\frac{1}{4}''$, ft. lbs./in. | 4.2 | 3.4 |
| Soaked, $\frac{1}{8}''$, ft. lbs./in. | 4.4 | 5.3 |
| Soaked, $\frac{1}{4}''$, ft. lbs./in. | 2.9 | 2.9 |

[a]bisphenol A polycarbonate, LEXAN ® 140
[b]KRO3, Phillips
[c]DPD 6109 Union Carbide
[d]LPX-15, Exxon
[e]OCF, Owens Corning Fiberglass, 415 BB Reinforced compositions with excellent gasoline resistance were obtained.

The above-mentioned patents, applications, and publications are incorporated herein by reference. Obviously, many variations will suggest thermselves to those skilled in this art in light of the detailed description herein. For example, instead of a bisphenol-A polycarbonate, one containing units derived from tetramethyl-bisphenol-A or from dixylenol sulfone can be used. Instead of a butadiene-styrene copolymer an isoprene-styrene copolymer can be used. Instead of an ethylene-ethyl acrylate copolymer, there can be used copolymers of ethylene and methyl methacrylate, ethylene and acrylic acid and ethylene and methacrylic acid. Instead of a linear low density polyethylene comprising units of ethylene and butene-1, there can be substituted one comprising units of ethylene and octene-1. The compositions can be provided in flame retardant modifications. All such obvious variations are within the full intended scope of the appended claims.

The polycarbonates employed in the compositions of this invention most preferably do not include any structural units of the formula

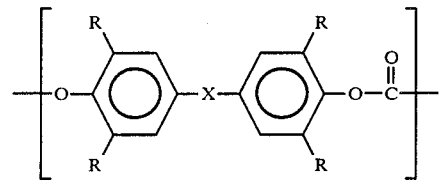

wherein R is the same or different and are alkyl of one to four carbon atoms inclusive and X is $C_1$–$C_5$ alkylene or alkylidene. R is preferably the same, each being methyl.

The polycarbonates may include no more than about 20% of the structural units of the above formula, preferably no more than about 10% of the structural units of the above formula.

What is claimed is:

1. A resin mixture comprising:
   (a) an aromatic polycarbonate resin and
   (b) a modifier combination therefor comprising
      (i) a coupled resinous block copolymer having blocks comprising polymerized vinyl aromatic units connected to blocks comprising polymerized diene units; and
      (ii) a copolymer of an olefin and at least one of a $C_1$–$C_6$ alkyl acrylate, a $C_1$–$C_6$ alkyl methacrylate, acrylic acid, methacrylic acid, or a mixture of any of the foregoing, said modifier being present in said mixture in an amount of at least sufficient to impart to said mixture a resistance to environmental stress crazing and cracking greater than that possessed by said polycarbonate resin wherein component (a) comprises from about 50 to about 96 parts by weight; component (b)(i) comprises from about 2 to about 25 parts by weight; and component (b)(ii) comprises from about 2 to about 25 parts by weight, per 100 parts by weight of components (a), (b)(i) and (b)(ii) combined.

2. A resin mixture a defined in claim 1 wherein in the aromatic carbonate polymer comprises recurring structural units of the formula:

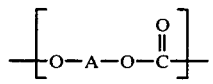

wherein A is a divalent aromatic radical of a dihydric phenol.

3. A resin mixture as defined in claim 2 wherein in said formula, A is derived from a 4,4'-dihydroxy-di(-mononuclear aryl)alkane.

4. A resin mixture as defined in claim 1 wherein said aromatic polycarbonate (a) comprises poly(2,2-dyhydroxydiphenylpropane)carbonate.

5. A resin mixture as defined in claim 1 wherein said copolymer resin (b)(i) comprises polymerized styrene units and polymerized diene units.

6. A resin mixture as defined in claim 1 wherein said copolymer component (b)(ii) comprises a copolymer of ethylene and ethyl acrylate.

7. A resin mixture comprising
  (a) an aromatic polycarbonate resin as defined in claim 1, and
  (b) a modifier combination therefor comprising
    (i) a coupled resinous block copolymer having blocks comprising polymerized vinyl aromatic units connected to blocks comprising polymerized diene units;
    (ii) a copolymer of an olefin and at least one of a $C_1$-$C_6$ alkyl acrylate, a $C_1$-$C_6$ alkyl methacrylate, acrylic acid or methacrylic acid; and
    (iii) a polyolefin resin,
said modifier being present in an amount sufficient to impart to said mixture a resistance to environmental stress crazing and cracking greater than that possessed by said polycarbonate resin wherein component (a) comprises from about 60 to about 89 parts by weight, component (b)(i) comprises from about 5 to about 20 parts by weight, component (b)(ii) comprises from about 5 to about 20 parts by weight, and component (b)(iii) comprises from about 1 to about 10 parts by weight, per 100 parts by weight of components (a), (b)(i), (b)(ii) and (b)(iii) combined.

8. A resin mixture as defined in claim 7 wherein the aromatic carbonate polymer comprises recurring structural units of the formula:

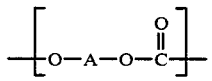

wherein A is a divalent aromatic radical of a dihydric phenol.

9. A resin mixture as defined in claim 8 wherein in said formula, A is derived from a 4,4'-dihydroxydi(-mononuclear aryl)alkane.

10. A resin mixture as defined in claim 7 wherein said aromatic polycarbonate (a) comprises poly(2,2-dihydroxydiphenylpropane)carbonate.

11. A resin mixture as defined in claim 7 wherein said copolymer resin (b)(i) comprises polymerized styrene units and polymerized butadiene units.

12. A resin mixture as defined in claim 7 wherein said copolymer component (b)(ii) comprises a copolymer of ethylene and ethyl acrylate.

13. A resin mixture as defined in claim 7 wherein said polyolefin resin (b)(iii) is selected from a polyethylene resin, a polypropylene resin or an ethylene-propylene copolymer resin.

14. A resin mixture as defined in claim 7 wherein said polyolefin resin (b)(iii) is a linear low density polyolefin resin.

15. A resin mixture as defined in claim 13 wherein said linear low density polyolefin resin is a linear low density polyethylene resin.

16. A resin mixture as defined in claim 15 wherein said linear low density polyethylene resin is a copolymer of ethylene and butene-1.

17. A resin mixture as defined in claim 1 or 7 including a reinforcing amount of a reinforcing agent.

18. A resin mixture as defined in claim 17 wherein said reinforcing agent is chopped glass filaments.

19. An article molded from the composition of claim 1.

20. An article molded from the composition of claim 7.

21. A resin mixture comprising:
  (a) an aromatic polycarbonate resin having no more than about 20% of the structural units of the formula

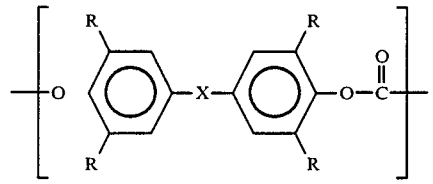

wherein R is the same or different and is alkyl of one to four carbon atoms, inclusive and X is $C_1$-$C_5$ alkylene or alkylidene, and
  (b) a modifier combination therefor comprising
    (i) a coupled resinous block copolymer having blocks comprising polymerized vinyl aromatic units connected to blocks comprising polymerized diene units; and
    (ii) a copolymer of an olefin and at least one of a $C_1$-$C_6$ alkyl acrylate, a $C_1$-$C_6$ alkyl methacrylate, acrylic acid, methacrylic acid, or a mixture of any of the foregoing,
said modifier being present in said mixture in an amount of at least sufficient to impart to said mixture a resistance to environmental stress crazing and cracking greater than that possessed by said polycarbonate resin wherein the amount of modifier combination (b) ranges from about 4.0 to about 50 parts by weight per 100 parts by weight of resin (a) and modifier combination (b) together.

22. A resin mixture comprising
  (a) an aromatic polycarbonate resin as defined in claim 1, and
  (b) a modifier combination therefor comprising (i) a coupled resinous block copolymer having blocking comprising polymerized vinyl aromatic units connected to blocks comprising polymerized diene units;
(ii) a copolymer of an olefin and at least one of a $C_1$–$C_6$ alkyl acrylate, a $C_1$–$C_6$ alkyl methacrylate, acrylic acid or methacrylic acid; and
(iii) a polyolefin resin, said modifier being present in an amount sufficient to impart to said mixture a resistance to environmental stress crazing and cracking greater than that possessed by said polycarbonate resin wherein the amount of modifier combination (b) ranges from about 4.0 to about 50 parts by weight per 100 parts by weight of resin (a) and modifier combination (b) together.

* * * * *